US008989699B2

(12) United States Patent
Hatton et al.

(10) Patent No.: US 8,989,699 B2
(45) Date of Patent: Mar. 24, 2015

(54) METHODS AND APPARATUS FOR SELECTIVE EMERGENCY ALERT NOTIFICATION AND RESPONSE

(75) Inventors: David Anthony Hatton, Berkley, MI (US); Robert Earl Johnson, Jr., Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 611 days.

(21) Appl. No.: 12/844,591

(22) Filed: Jul. 27, 2010

(65) Prior Publication Data

US 2012/0028599 A1 Feb. 2, 2012

(51) Int. Cl.
*H04W 4/22* (2009.01)
*G08G 1/0967* (2006.01)

(52) U.S. Cl.
CPC .... *G08G 1/096716* (2013.01); *G08G 1/096741* (2013.01); *G08G 1/096775* (2013.01)
USPC .................. 455/404.2; 455/404.1; 455/412.2; 455/456.1; 455/456.3; 455/456.6; 340/905; 340/995.12; 340/995.13

(58) Field of Classification Search
CPC .................. G08G 1/096716; G08G 1/096741; G08G 1/096775
USPC .......... 455/401.1–404.2, 412.2, 414.1–414.3, 455/456.1, 456.3, 457, 569.2; 701/203, 701/200, 213, 469, E17.018, E17.108, 202, 701/210, 211, 119, 208; 340/905, 988, 989, 340/990, 995.11, 995.12, 995.13, 995.14, 340/995.24
See application file for complete search history.

(56) References Cited

U.S. PATENT DOCUMENTS

| | | | | |
|---|---|---|---|---|
| 7,161,504 | B2 | 1/2007 | Linn | |
| 7,772,996 | B2 | 8/2010 | Burns | |
| 8,884,787 | B2 | 11/2014 | Burns | |
| 2002/0128774 | A1* | 9/2002 | Takezaki et al. | 701/211 |
| 2006/0264245 | A1* | 11/2006 | Luo | 455/567 |
| 2007/0139182 | A1 | 6/2007 | O'Connor et al. | |
| 2007/0265768 | A1* | 11/2007 | Brown, Jr. | 701/200 |
| 2009/0072997 | A1* | 3/2009 | Shrum, Jr. | 340/905 |

(Continued)

FOREIGN PATENT DOCUMENTS

| | | | |
|---|---|---|---|
| CN | 1762147 | A | 4/2006 |
| CN | 101401007 | A | 4/2009 |
| CN | 101536555 | A | 9/2009 |

(Continued)

OTHER PUBLICATIONS

Kermit Whitfield, A Hitchhiker's Guide to the Telematics Ecosystem, Automotive Design & Production, Oct 2003, http://findarticles.com/p/articles/mi_0KJI/is_10_115/ai_n0601894/?tag=content,col1, printed Aug. 4, 2009.

(Continued)

*Primary Examiner* — Babar Sarwar
(74) *Attorney, Agent, or Firm* — Jennifer M. Stec; Brooks Kushman P.C.

(57) ABSTRACT

Various embodiments include communicating emergency information to a vehicle. A computer may receive one or more emergency notifications issued by a government agency. Additionally, a geographic location of a vehicle may be determined based on GPS data. At least one emergency notification may be selected based on the geographic location of the vehicle and a geographic attribute of the emergency notifications. The selected emergency notifications may be output so that the notification may be presented to a vehicle occupant. In some embodiments, the notification may be output depending on the direction that the vehicle is travelling.

15 Claims, 5 Drawing Sheets

(56) References Cited

U.S. PATENT DOCUMENTS

| | | | | |
|---|---|---|---|---|
| 2009/0307720 A1 | | 12/2009 | Turner | |
| 2009/0322560 A1* | | 12/2009 | Tengler et al. | 340/905 |
| 2009/0325538 A1 | | 12/2009 | Sennett et al. | |
| 2011/0018736 A1* | | 1/2011 | Carr | 340/902 |

FOREIGN PATENT DOCUMENTS

| | | | |
|---|---|---|---|
| CN | 101720461 | A | 6/2010 |
| EP | 1 640 936 | A1 | 3/2006 |

OTHER PUBLICATIONS

Ford Motor Company, "Navigation System: SYNC," Owner's Guide Supplement, SYNC Version 1 (Jul. 2007).

Ford Motor Company, "SYNC," Owner's Guide Supplement, SYNC Version 1 (Nov. 2007).

Ford Motor Company, "Navigation System: SYNC," Owner's Guide Supplement, SYNC Version 2 (Oct. 2008).

Ford Motor Company, "SYNC," Owner's Guide Supplement, SYNC Version 2 (Oct. 2008).

Ford Motor Company, "Navigation System: SYNC," Owner's Guide Supplement, SYNC Version 3 (Jul. 2009).

Ford Motor Company, "SYNC," Owner's Guide Supplement, SYNC Version 3 (Aug. 2009).

Chinese Patent and Trademark Office, Chinese Office Action for the corresponding Chinese Patent Application No. 201110220987.4 mailed Oct. 10, 2014.

* cited by examiner

METHODS AND APPARATUS FOR SELECTIVE EMERGENCY ALERT NOTIFICATION AND RESPONSE

BACKGROUND

1. Technical Field

Various embodiments relate to a method and system for notifying a vehicle occupant of local, state, and national emergencies. The vehicle occupant may also respond to the emergency notifications. In some embodiments, the vehicle's location may be used to determine which notifications to present to the vehicle occupant.

2. Background Art

Alerting the public of emergencies, such as child abductions, weather-related emergencies, and public safety emergencies, is left to the local, state, and Federal governments to broadcast. Traditionally, such alerts were broadcasted through television and radio.

Various examples in the field exist that provide ways of broadcasting public emergencies. As one example, U.S. Publication No. 2009/0322560 to Tengler et al. discloses an in-vehicle alert delivery maximizing communications efficiency and subscriber privacy. Specifically, the publication discloses a system and method for enhancing subscriber privacy while delivering location-based in-vehicle alerts to the subscribers of a mobile traffic reporting system. This is accomplished by disassociating subscriber information from location information transmitted by a traffic probe vehicle. The in-vehicle alerts include flash flood alerts, hurricane alerts, amber alerts, as well as non-crisis alerts, such as traffic hotspots, locations of inexpensive gas stations, and various points of interest.

Another example is U.S. Publication No. 2009/0325538 to Sennett et al. disclosing a method for geo-targeting emergency alerts. The publication specifically discloses that geo-targeting may be used in combination with wireless alert capabilities to provide alerts to a more granulated geographical area. A system and method for performing geo-targeting for various alert areas is discussed in the publication such that emergency messages may be delivered to mobile and static devices of different types in a localized area. As an example offered in the publication, geo-targeting supports the delivery area for wireless emergency alerts by identifying the cell sites that are in a specified geographic area that have technology capable of delivering wireless emergency alerts. The components of the telecommunications system that support a wireless emergency alert system may be identified and mapped to any geographical area.

Another example is U.S. Publication No. 2007/0139182 to O'Connor et al. which discloses emergency communications for the mobile environment. The publication specifically discloses systems and methods for two-way, interactive communication regarding emergency notifications and responses for mobile environments. A specific geographic area is designated for selective emergency communications. The emergency communications may comprise text, audio, video, and other types of data. The emergency notification is sent to users' mobile communications devices such as in-vehicle telematics units, cellular phones, personal digital assistants (PDAs), and laptops that are currently located in the designated area. The sender of the emergency message or the users' service provider(s) may remotely control cameras and microphones associated with the users' mobile communications devices. As an example offered in the publication, a rear camera ordinarily used when driving in reverse may be used to capture images and video that may assist authorities in searching for a suspect. The users' vehicles may send photographs or video streams of nearby individuals, cars and license plates, along with real-time location information, in response to the emergency notification. Image recognition algorithms may be used to analyze license plates, vehicles, and faces captured by the users' cameras and determine whether they match a suspect's description.

Another example is U.S. Publication No. 2007/0265768 to Brown, JR. disclosing a dash mounted or handheld audible-visual road advisory-information system device. The publication specifically discloses a dash mounted or handheld audible-visual road advisory-information system device for improving driver awareness and highway safety that outputs amber alert warning notices and highway advisory information. The device also provides a summary of businesses and contact numbers, operating hours, and detailed summaries of business services, special sales and advertisements which are found-located on a highway and at a highway exit. The information is presented in electronic voice through speaker and in text on display screen mounted either on the dash of a vehicle, built inside a vehicle radio, or a portable-mobile handheld device.

SUMMARY

One aspect includes a computer-implemented method for communicating emergency information to a vehicle. The method includes receiving on a vehicle computer one or more emergency notifications (e.g., government issued emergency notifications) having a geographic attribute and, further, receiving GPS data. A geographic location of the vehicle based on the GPS data may be determined. Based on the geographic location of the vehicle and the geographic attribute, at least one emergency notification is selected and output that the notification may be presented to the vehicle occupant.

In one embodiment, a proximity of the vehicle to the geographic attribute may be received and/or determined and the selected emergency notification output based on the proximity. In additional embodiments, a distance parameter defining a distance from the geographic location of the vehicle may be utilized in outputting the emergency notification based on the distance parameter.

In some embodiments, the geographic location of the vehicle may be based on a direction of travel of the vehicle.

In some embodiments, the selected emergency notification may be an updated notification.

Another aspect includes a computer program product for communicating emergency information in a vehicle. The computer program product may include instructions for receiving one or more emergency notifications having a geographic attribute and additionally receiving GPS data. The computer program product may also include instructions for determining the vehicle geographic location based on the GPS data and determining a direction of travel of the vehicle. Depending on the geographic location of the vehicle and the direction of travel, one or more emergency notifications may be output which may be presented to a vehicle occupant.

The direction of travel may be determined based on the geographic attribute of the emergency notification(s).

In some embodiments, one or more emergency notifications may be output based on a default notification location (which may or may not be defined by the vehicle occupant) and the geographic attribute. In further embodiments, the emergency notification may be output based on a distance parameter defining a distance from the default notification location.

In some embodiments, the notification may be output until the vehicle occupant acknowledges the one or more emergency notifications. This may define an output priority of the notifications.

Another aspect includes a system comprising at least one data processor configured to receive emergency notifications and GPS data. The data processor may be further configured to determine a geographic location of the vehicle based on the GPS data. A selection of at least one emergency notification may be executed based on the vehicle's geographic location. The selected emergency notification may be transmitted so that the notification may be presented to a vehicle occupant.

In some embodiments, the emergency notifications may include one or more images of a subject of the emergency notifications including, but not limited to, missing persons, suspected criminals, and/or missing vehicles. In some embodiment, the image may be a license plate.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the invention are disclosed herein. However, it is to be understood that the disclosed embodiments are merely exemplary of an invention that may be embodied in various and alternative forms.

Therefore, specific functional details disclosed herein are not to be interpreted as limiting, but merely as a representative basis for the claims and/or as a representative basis for teaching one skilled in the art to variously employ the present invention.

In an increasingly mobile society, broadcasting public emergencies to a broad membership can be a challenge, particularly to those members of the public who spend time travelling. One reason for this challenge is that subscribers of such information generally receive notifications in the areas defined in a subscription.

Another reason may be that alerts are based on static geographic data. That is, alert may be transmitted to members of the public that are identified in particular geographic areas. For example, if a member of the public travels from point A to point B, and an emergency broadcast was transmitted in point B, the member of the public may not receive the broadcast in point B because the member of the public was not identified as being in the geographic area. Therefore, an emergency notification and response system and method that uses geographic data associated with a vehicle and/or vehicle occupant as part of emergency notification broadcasts may be helpful.

Figure 1:
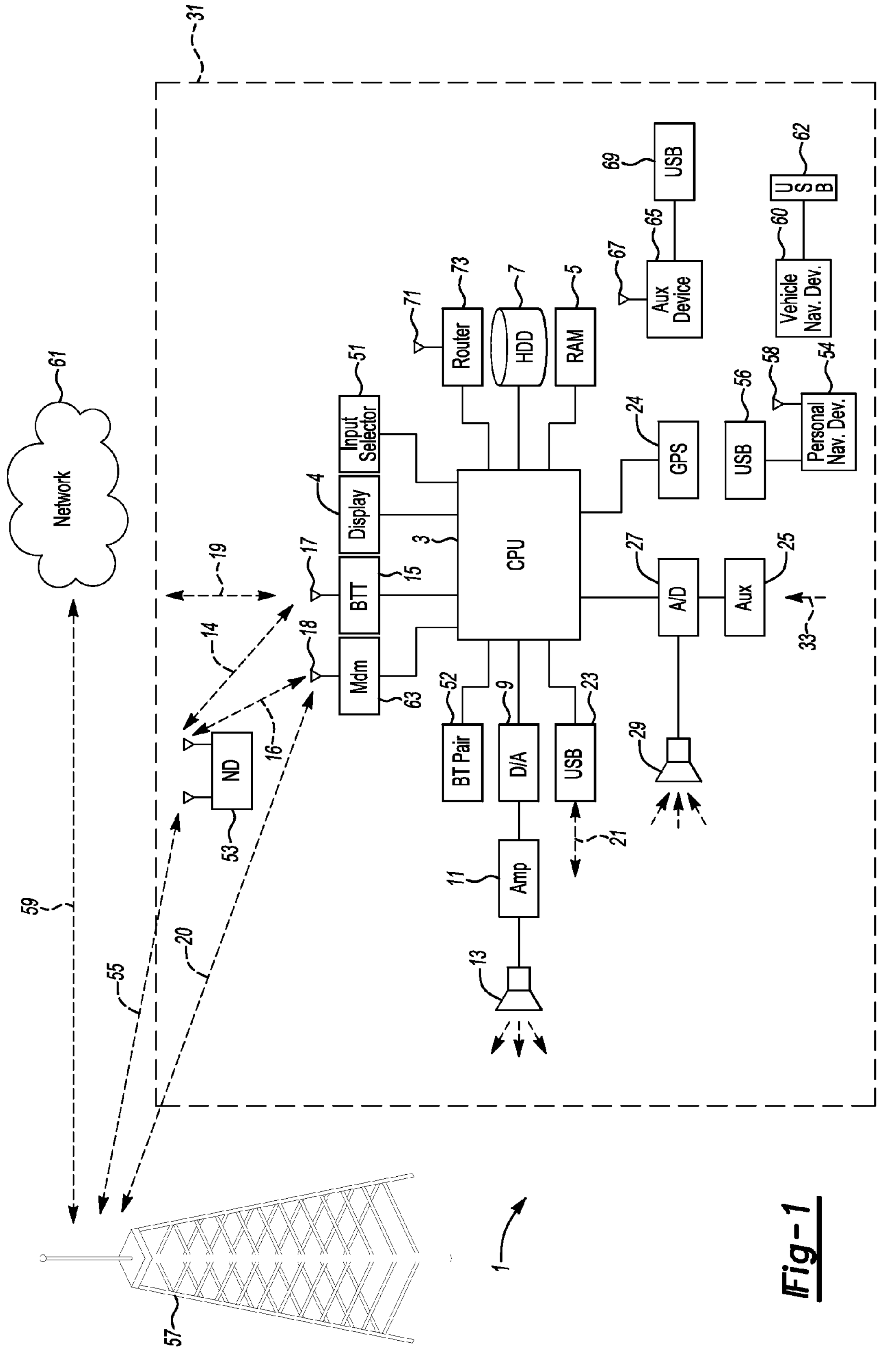
FIG. 1 is a detailed block diagram of a vehicle-computing system.
Figure 2:
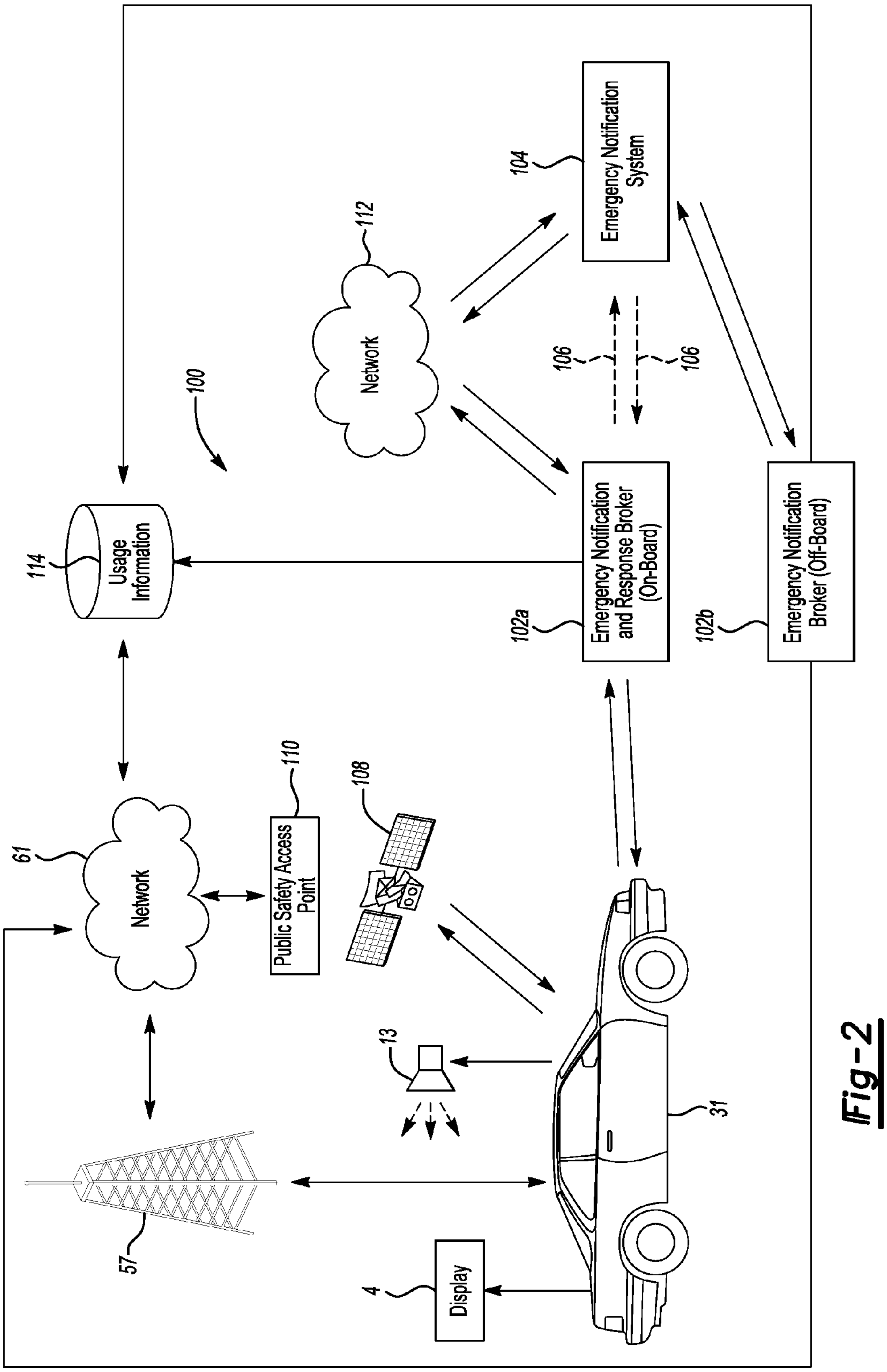
FIG. 2 illustrates a block diagram of a system that notifies a vehicle occupant of emergencies and enables responses to the emergencies by the vehicle occupants.

FIG. 1 illustrates an example block topology for a vehicle computing system 1 (VCS) utilized in a vehicle-based emergency notification and response system. FIG. 2 is a non-limiting illustration of a system for emergency notification and response. The system 100 may operate to notify a vehicle occupant of federal, state, and local emergencies in the vehicle. The vehicle occupant(s) may also respond to such emergency notifications via system 100. Emergencies may include, but are not limited to, environment-related emergencies (such as tornadoes, hurricanes, severe thunderstorms, and other environmental threats) and community-related emergencies (including, but not limited to, local, state, and federal emergencies such as child abductions and public safety/health emergencies).

Referring first to FIG. 1, a vehicle enabled with the VCS 1 may contain a visual front end interface 4 located in the vehicle. The user may also be able to interact with the interface if it is provided, for example, with a touch sensitive screen. In another illustrative embodiment, the interaction occurs through, button presses, audible speech and speech synthesis. An example of such a VCS 1 is the SYNC system manufactured and distributed by THE FORD MOTOR COMPANY.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (ND) can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11 g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54 having, for example, a USB connection 56 and/or an antenna 58, a vehicle navigation device 60 having a USB 62 or other connection, an onboard GPS device 24, or a remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

Referring now to FIG. 2, as described above, the vehicle 31 may be outfitted with the VCS 1 (e.g., a vehicle-based data processor) which may communicate and process data that it receives within the vehicle. The VCS 1, furthermore, may have installed programmed software logic for brokering emergency notifications and responses received by the VCS 1. The on-board emergency notification and response broker 102*a* may be programmed to the VCS 1 and/or installed as software from a computer-readable medium (including, but not limited to, CD-ROMs, DVDs, flashdrives, one or more servers, and the like). The logic may be installed to the VCS 1 by an OEM during vehicle production, a vehicle dealer, or a user (e.g., a vehicle occupant) after acquisition of the vehicle. In some embodiments, the broker 2 may be installed from a software repository or database.

The broker 102*a* may be activated and operated during vehicle operation (e.g., when the vehicle 31 is powered). However, the user may opt to turn off emergency notifications. Alternatively or additionally, the broker 102*a* may be activated in response to manual user activation (e.g., via a tactile and/or verbal activation instruction). When activated, the broker 102*a*, via the VCS 1, may communicate with an emergency notification system (ENS) 104 from which it may receive emergency event notifications. The broker 102*a* may communicate with the emergency notification system 104 via wired or wireless communication. In one embodiment, the communication may be via network 112. Network 112 may be the communication network used by ENS 104 for broadcasting emergency notifications as is known in the art. As a non-limiting example, network 112 may be a cellular carrier. It will be appreciated that network 61 and network 112 may be the same or different networks, but for clarity, the networks are illustrated as being separate networks. In another embodiment, the broker 102*a* may communicate 106 directly with the ENS 104 via a communication network now or later known in the art.

In some embodiments, the communication may additionally or alternatively include USB, firewire, WiFi, WiMax, cellular, radio frequency (RF), BLUETOOTH, and the like. In some further embodiments, the VCS 1 may include an application programming interface (API) permitting communication between the broker 102*a* and the ENS 104.

In one embodiment, the broker 102*a* may be implemented in the ND 53. The ND 53 may communicate with the VCS 1 as described above. In this case, the nomadic device may include an API for permitting communication between the nomadic device and the VCS 1. This API, or an additional API implemented in the VCS 1, may permit communication with the ENS 104. The broker 102*a* may be installed to the nomadic device through similar methods described above.

The emergency notifications may include information associated with an emergency including, but not limited to, dates, times, geographic attributes (e.g., and without limitation, location information) descriptions, identification information, severity of the condition, and the like. Alternatively or additionally, the emergency notifications may include images. The images may be of (without limitation) individuals, vehicle license plate numbers, vehicles, weather conditions, and other like images. Accordingly, visuals may be provided in the emergency notification(s).

The broker 102*a* may receive emergency notifications from the ENS 104 in a number of ways. As one non-limiting example, the broker 102*a* may monitor the information from the ENS 104 for new emergency notifications. In some embodiments, when the emergency notifications are transmitted from the ENS 104, the notifications may be stored in a database or other repository (not shown) which the broker 102*a* monitors for the new/updated emergency notifications.

In this case, the notifications may be transmitted by the ENS 104 or an intermediary entity (e.g., a cellular carrier at network 112).

In one embodiment, emergency notifications may be stored in memory. As an example, the modifications may be stored in memory 5, 7 or off-board memory (not shown). The broker 102*a* may be programmed to identify new/updated emergency notifications based on information from the emergency notifications stored in memory. This information may include, but is not limited to, keywords, keyphrases, graphics, images, and the like. Further, a combination of information may be utilized.

As the broker 102*a* monitors the ENS 104 for new notifications, the broker may use the information (or a combination of information) obtained from the stored notifications to determine which notification(s) from the ENS 104 are new. This may be accomplished using logic programmed to the broker 102. This logic may be, without limitation, text recognition logic, speech recognition logic and/or image recognition logic. Text/speech recognition logic may include the recognition of numeric characters, alphabetic characters/speech, alphanumeric characters/speech, and the like. The recognition information may be alternatively stored in a lookup table (not shown) on the VCS 1 along with an identifier (e.g., and without limitation, a numeric, alphabetic, or alphanumeric identifier) identifying each notification.

To determine if a new notification has been issued by the ENS 104, the broker 102*a* may compare the stored notification(s) with notifications from the ENS 104 using the information (or combination of information). In one embodiment, where there is a match, the broker 102*a* does not receive the notification(s). Alternatively, where there is no match, the broker 102*a* may receive and store the notification(s). In another embodiment, the notification may be received regardless of there being a match. In this case, the information from the stored notification(s) may be used to identify the new notification so that the vehicle occupant may be notified that a new notification has been received.

As an example, stored notifications may be associated with keyword information. For example, if the notification is an AMBER alert, the abducted child's name may be used as a keyword. The keyword may be associated with the notifications when stored in memory. When the broker 102*a* monitors the notifications received from the ENS 104, the keyword may be used to determine if the incoming notification has already been received or there is an update to the notification(s).

As another example, stored notifications may include an image (such as of a missing person). When the broker 102*a* monitors the notifications received from the ENS 104, image processing of the store notification(s) may be accomplished to determine if the incoming notification(s) has been received or an update exists.

The ENS 104 may be monitored periodically by the broker 102*a*. For example, the monitoring may occur hourly, daily, weekly, bi-monthly, or based on other periodic patterns. Further, the stored notifications may be periodically presented to the user. The period may be predetermined and set by an OEM, a dealer, or the vehicle occupant.

The broker 102*a* may additionally or alternatively receive emergency notifications by transmitting requests to the ENS 104. These requests may be transmitted periodically.

In one embodiment, the broker 102*a* may track which notifications are stored in memory and send one or more requests to the ENS 104 to receive new and/or updated notifications. The broker 102*a* may track the stored notifications using information associated with the stored notifications as described above (keyword, keyphrases, etc.). Additionally or alternatively, the stored notifications may be associated with time and date information. For example (and without limitation), each stored notification may include a time and/or date stamp which may be associated with the notification(s) when stored. Using the information associated with each stored notification, the broker 102*a* may request for new or updated notifications. As a non-limiting example, using the date stamp, the broker 102*a* may request for notification(s) that are dated after the date of a stored notification. In one embodiment, the broker 102*a* may receive all notifications in response to a request and the new and/or updated notifications may be filtered and identified by the broker 102*a*.

In one embodiment, the broker 102*a* may receive from the ENS 104 specific types of notifications. For example, the broker 102*a* may receive only weather-related notifications. As another example, the broker 102*a* may only receive AMBER alerts within a geographic area. It will be appreciated that the broker 102*a* may receive one or multiples types of alerts/notifications. The types of notifications which the broker 102*a* receives may be determined based on the subscription profile of the vehicle occupant. The subscription profiles are described below with respect to FIG. 3. Alternatively or additionally, the notifications that are received may be predetermined. For example, the broker 102*a* may be programmed to always receive certain types of notifications (e.g., AMBER alerts, catastrophic weather emergencies, etc.).

Some notifications may expire. As such, the stored notifications may be presented until the notification(s) expire. Once notification(s) expire, they may be deleted from memory. As an example, weather related emergencies may include a time and date that the weather advisory is in effect. Once this time/date has passed, the stored notifications may be deleted from memory.

It will be appreciated that emergency notifications may also be received and identified without stored notifications on the VCS 1. However, in some embodiments, the notification(s) may be filtered as described above (e.g., based on specific notification types identified in the subscription profile).

The notifications may be presented audibly or visually. For example, an emergency notification may be presented in a spoken language through speaker 13. Text speech technology may be used (as known in the art) for audibly outputting notification. Alternatively, speech to text technology may be used (as known in the art) for visually outputting notifications. It will be appreciated that audible notifications may also be presented as beeps, chimes, and other audible sounds signifying the presence of one or more emergency notifications. As another example, the emergency notification(s) may be displayed on the display 4 (e.g., and without limitation, pop ups, scrolling text, graphics/images, and the like). The notifications may include text, numbers, images, graphics, or a combination of these visuals. Further details of the presentation process are described below with respect to FIG. 4.

A priority may be assigned to the emergency notifications defining the output priority given to the notification(s). As such, the notification(s) may be presented so as to catch the attention of the vehicle occupant and may not be removed/deleted until the user acknowledges the notification(s). An acknowledgment may include, but is not limited to, storing the notification(s), deleting the notification(s), minimizing the notification(s), submitting an acknowledgment (e.g., touching an "ok" button on the touchscreen display or saying "ok"), and the like. It will be appreciated that these examples are for explanation and, therefore, are not intended to be limiting. Further, the types of acknowledgments may be varied without departing from the scope of the invention.

As an example of output priority, a pop up may be displayed and given focus on the display until the user acknowledges the pop up. As another non-limiting example, the notification may be verbalized through the speaker 13 repeatedly (and in some embodiments, frequently) until the user acknowledges the notification. As another non-limiting example, a beep or chime may be repeatedly or periodically played (e.g., every minute) signifying the presence of the notification(s). The beep or chime may be played until the user requests (via an audible and/or tactile command) the notification(s). The notification(s) may be presented acknowledged.

The notification(s) may be presented to the user automatically and/or in response to manual input. Automatic presentation of the notification(s) is described above. In the case of manual notification, the vehicle occupant may navigate a menu on the VCS 1 to retrieve the notifications. Menu navigation may be performed through tactile inputs and/or spoken inputs. For example, the vehicle occupant may use a touchscreen display to navigate the menu. Alternatively or additionally, the vehicle occupant may use spoken commands.

In some embodiments, the vehicle occupant may also use manual inputs to search the notifications stored in the VCS 1. Notifications may be stored on the VCS 1 until they are deleted in response to, for example, manual deletion and/or notification expiration.

Emergency notifications may be received in the vehicle 31 whether or not the vehicle 31 has been started (i.e., is powered). For example, if the vehicle is powered off (and, therefore, not running), the VCS 1 may nevertheless receive sufficient power from the vehicle's battery to receive the notifications. In either case the received notification(s) may be queued in memory. When the vehicle is powered and/or the notification service is activated, the notification(s) may be transmitted from the queue and presented to the user. The notification message(s) may be queued according to methods known in the art.

Referring back to FIG. 2, the ENS 104 may be any government, community, or other public agency issuing emergency notifications. In some embodiments, the ENS 104 may be comprised of terminals, servers, networks, and databases for exchanging data to and from the VCS 1. The specific configuration of the ENS 104 may be arranged according to various implementations without departing from the scope of the invention.

As described above, the emergency notifications may be presented on display 4 and/or through speaker 13. Further details of the presentation process are described below with respect to FIG. 4.

The broker 102*a* may use GPS data received from a satellite 108. As will be further described below, the GPS data may be used to target emergency notifications according to the geographic area of the vehicle 31. The geographic area may be the vehicle occupant's default or "home" location (as defined by the user), one or more areas along a route, or both. The geographic area may comprise different levels of granularity such as street, zip code, city, county, state, and national areas.

A vehicle occupant may contact a public safety access point (PSAP) 110 from the vehicle 31 in response to receiving an emergency notification. The vehicle occupant may do so using traditional methods (e.g., manually placing a call from the ND 53). Alternatively, the vehicle occupant may do so via a command instructing a connection to the PSAP 110. Commands may be audible and/or tactile. For example, the command may be to place a call to the PSAP 110 or send a textual message (e.g., an electronic mail message, text message, or instant message (IM)). In one embodiment, the emergency notification(s) may include a link, button, or other input for contacting the PSAP 110. For example, a notification presented on display 4 may include an input which, when selected, results in a call being placed to the PSAP 110. As another example, the input may be an input which causes a textual message to be sent to the PSAP 110. In the case of textual messages, the broker 102*a* may be programmed to generate a message using the VCS or ND built-in messaging tools. Alternatively, the broker 102 may generate message(s) using messaging tools located, e.g., on a remote server (not shown) via network 61. The PSAP 110 may respond to the message with a call and/or with return textual message(s).

A PSAP 110 may be any agency responsible for responding to emergencies including, but not limited to, a fire department, police departments, or any other agency associated with an emergency call. Further details of the communication with the PSAP 110 will be described below.

In the embodiments described above, the broker 102*a* is an on-board broker. In an alternative embodiment, the emergency notification brokering system may be an off-board broker 102*b*. An off-board broker may be a media broadcasting service (e.g., radio and/or television) or an emergency notification service provider (e.g., an OEM). In one embodiment, the off-board broker 102*b* may entirely accomplish the tasks and operations described above (and in further detail below) for emergency notification and response. In this case, the VCS 1 and/or the ND 53 may have installed one or more application programs for enabling various functions associated with emergency notification and response. In other embodiments, there may be both an on-board and an off-board broker such that, e.g., a broker 102*a* operates in conjunction with a broker 102*b*.

An OEM may desire to collect usage information for the system 100. Accordingly, a usage database 114 may collect usage information from the on-board or off-board broker 102*a*, 102*b*. The usage information may be for gathering data on calls/messages to the PSAP 110, the number and/or types of notifications issued during a period of time and/or in one or more geographic areas, and the like. The usage information may be collected by the database 114 based on a flag, message, or other usage identifier transmitted to the database 114 in response to a usage event (e.g., a call placed to the PSAP 110).

Figure 3:
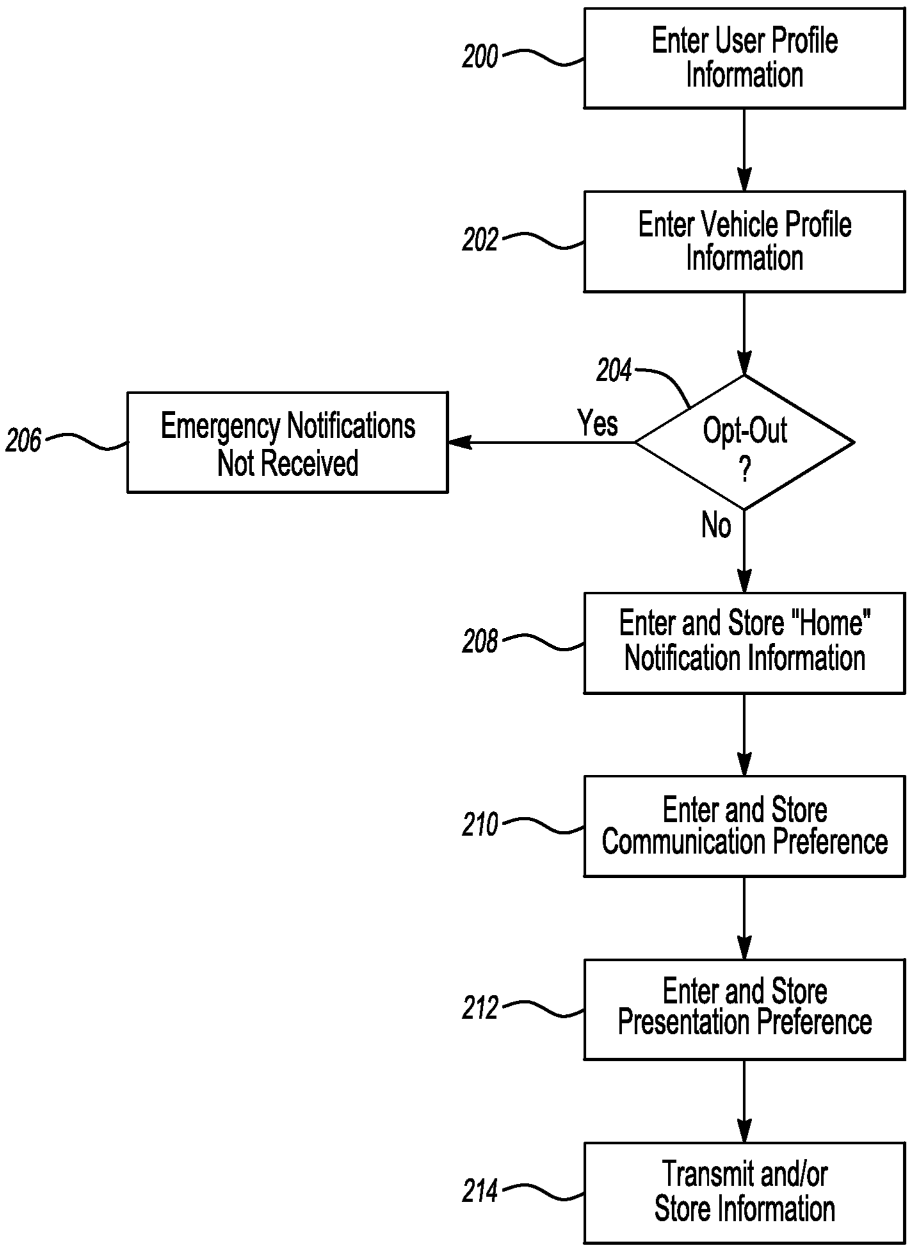
FIG. 3 illustrates a user registration process associated with the telematics services requested by a user to be performed in the vehicle.

FIG. 3 illustrates a process for user registration for enabling use of the VCS 1. As an example, the registration process may enable services to be activated within or loaded to the vehicle. These services may be loaded at registration or later. The registration process illustration in FIG. 3 may occur after vehicle acquisition. It will be appreciated that the registration process may occur locally at the VCS 1 or remotely such as (without limitation) on a personal computer (PC) or a nomadic device. In one embodiment, the registration process may occur over an Internet connection.

It will be appreciated that the disclosure and arrangement of FIG. 3 may be modified or re-arranged to best fit a particular implementation of the various embodiments of the invention. Further, it will be appreciated that the profile information and the configuration information may be provided and/or modified during or after initial registration.

A vehicle occupant may enter user profile information (block 200) and vehicle profile information (block 202) so that the broker 102 may identify the user and the vehicle, respectively. The user profile information may include information to identify the vehicle occupant(s). As an example, the user profile information may include a mobile identification number (MIN) associated with the vehicle occupant's nomadic device. Other information may include, but is not limited to, names and addresses of the user.

Vehicle profile information may include information about the vehicle 31. This information may include a vehicle identifier such as a vehicle identification number (VIN) associated with the vehicle. In addition to identifying the vehicle, this VIN may be used to register for/subscribe to vehicle-based services. Accordingly, the vehicle profile information may further include the vehicle-based services enabled in the vehicle. These vehicle-based services may be transmitted (according to well known methods) to the vehicle over a wired or wireless connection between the VCS 1 and the device used for generating the profile. Non-limiting examples of these wired or wireless connections are provided above.

The vehicle-based services may additionally or alternatively be associated with the ND 53 using the MIN. In this case, the vehicle-based services may be operated via the ND 53 (e.g., through a mobile application). Alternatively, the vehicle-based services may be associated with the vehicle 31 and the ND 53 using the VIN and the MIN, respectively. For example, and without limitation, the MIN may be used to identify the user of the service(s) and the VIN may be used to identify which service(s) are enabled. This may provide, for example, a multiple authentication process.

The emergency notification service may be a default (or automatic opt in) service offered to the vehicle occupant. Accordingly, the vehicle occupant may choose to opt out of the emergency notification service (block 204). However, it will be appreciated the user may choose to opt in or opt out of the emergency notification service without departing from the scope of the invention.

As illustrated in block 206, if the user chooses to opt out, emergency notifications may not be received. In some embodiments, despite an opt out, the user may nevertheless receive emergency notifications such as notifications that may be mandatory or may be a critical emergency. The broker 102 may be programmed to identify these notifications based on information associated with the notifications.

If the user does not opt out, the user may configure the emergency notification service as represented by blocks 208, 210, and 212. As illustrated in block 208, the notification preferences may be configured. For example, a default or "home" notification location may be defined. The "home" notification location may be the geographic location(s) for which the vehicle occupant regularly receives emergency notifications. The location(s) may be automatically determined (e.g., based on the user profile information and/or GPS information) or may be input by the user. This location may be based on where the user lives, works, or may be another location input by the user.

A radius (or distance) defining the area that the emergency notifications are received by a vehicle occupant may also be provided. For example, emergency notifications may be presented for emergencies that are within "X" distance (measured in, e.g., miles, kilometers, meters, etc.) of the "home" location. As another example, emergencies may be presented for emergencies that are within "X" distance of the vehicle's location (e.g., if not in the "home" location or there is no "home" location).

It will be appreciated that, in some embodiments, the geographic parameters may be predetermined. Other geographic parameters and the process of broadcasting emergencies are described in further detail with respect to FIG. 5.

As part of the notification targeting process, the broker 102*a, b* may determine the geographic coverage area of the notification based on the information in the notification. This may be referred to as a geographic attribute associated with the emergency notifications. Emergency notifications include a region or regions (e.g., county or state) that are effected by the emergency notifications. The broker 102*a, b* may intercept (e.g., from a data transmission) or interpret (e.g., from the notifications) this information to determine the regions effected. In one embodiment, a lookup table or a map database be used in the determination.

As illustrated in block 210, the vehicle occupant's communication preferences may be entered and stored for communicating with the PSAP 110. As described above, a phone call may be placed or text-based messages may be transmitted. The communication preference set by the user may be the default communication used. The user may also override the default and choose the communication mode from the VCS 1, e.g., before or during the communication event.

The presentation preferences may also be configured (block 212). This may include preferences as to audible presentation (and the types of audible presentations) or visual presentation (and the types of visual presentations). In some embodiments, the default presentation mode may be an audible presentation. As illustrated in block 214, the profile information and configuration information may be transmitted and/or stored on-board and/or off-board.

Figure 4:
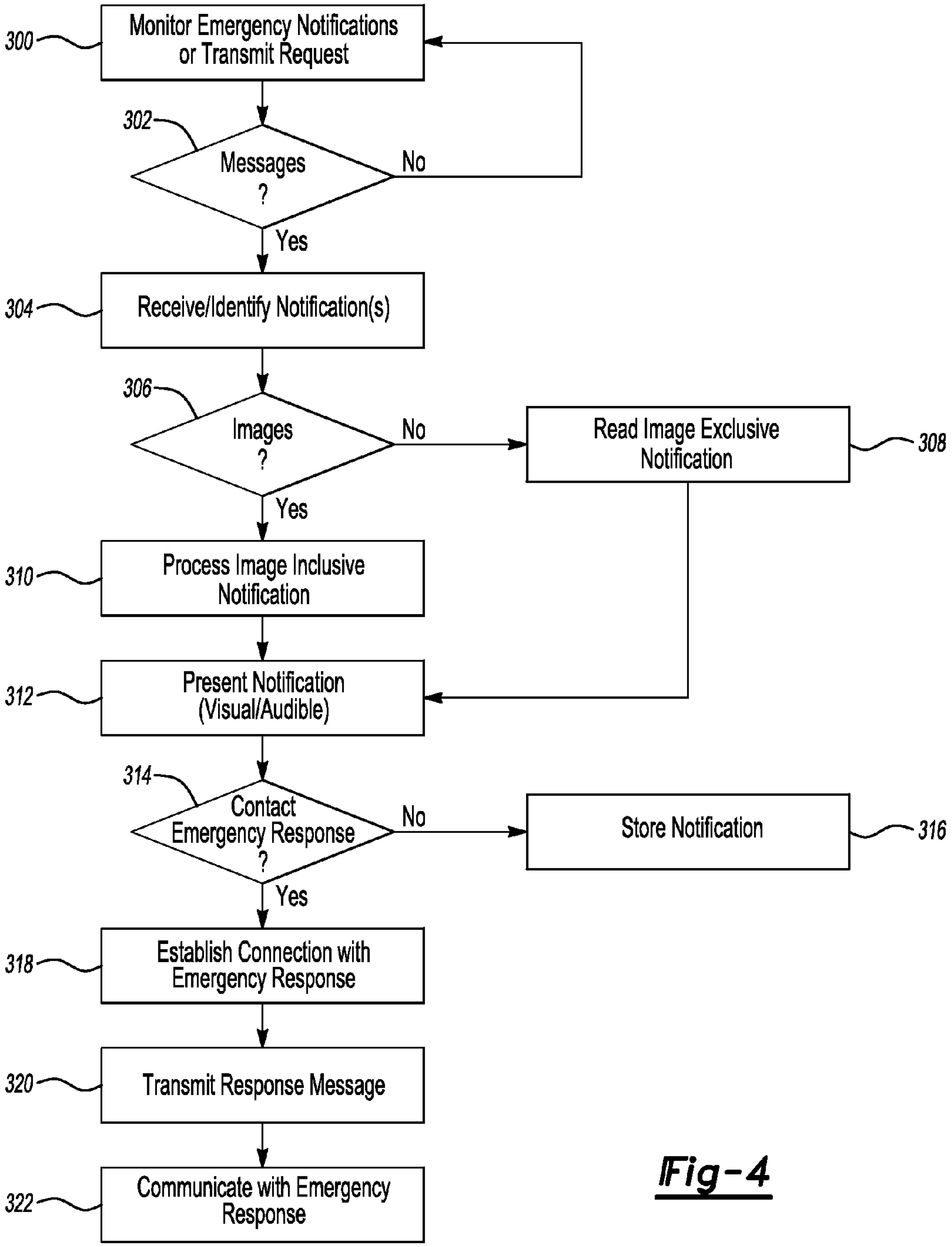
FIG. 4 illustrates the operation of the system illustrated in FIG. 2 according to one embodiment.

FIG. 4 illustrates the emergency notification and response process. It will be appreciated that the disclosure and arrangement of FIG. 4 may be modified or re-arranged to best fit a particular implementation of the various embodiments of the invention.

The emergency notifications from the ENS 104 may be monitored and/or request messages may be transmitted to the ENS 104 for the emergency notification(s) (block 300). If there are no messages (block 302), the monitoring may continue and/or request messages may continue to be sent. If messages are available, the notification(s) may be received and/or identified by the broker 102*a,b* (block 304) as described above.

As described above, the notification(s) may include images. Accordingly, a determination may be made by the broker 102*a,b* whether the notification(s) include images (block 306). If not, the broker 102*a,b* may process the image exclusive notification(s) for presentation (block 308). If the notification(s) include images, the image inclusive notification(s) may be processed (block 310) for presenting the image(s) to the vehicle occupant. The images may be embedded in the notification messages or obtained from a remote location (e.g., by following an electronic address path on the notification message).

The notification(s) may be presented to the vehicle occupant as illustrated in block 312. As described above, the presentation/broadcast may be visual and/or audible. Further details of the notification broadcast are described in further detail in FIG. 5.

The user may or may not contact a PSAP 110 in response to receiving a notification (block 314). In some embodiments, if the PSAP 110 is not contacted, the notification(s) may be stored on the VCS 1 (block 316). However, the notification(s) may alternatively be deleted if the PSAP 110 is not contacted.

If the PSAP 110 is contacted, the connection with the PSAP 110 may be established as described above (block 318). In some embodiments, the notification(s) may be stored. Further, as described above, usage information may be sent to and stored in a usage database 114 in response to contacting the PSAP 110.

Information associated with the vehicle may be transmitted to the PSAP 110 for purposes of identification and determining the vehicle occupant's location (block 320). Transmitting the location may be advantageous when, for example, the vehicle occupant has located an abducted child and/or has located the individual suspected of abduction. In some embodiments, the message may also identify the emergency notification to which the vehicle occupant is responding.

When a connection is established, the vehicle occupant(s) may then communicate with personnel of the PSAP 110 (block 322). The various communications modes are described above.

In one embodiment, the PSAP 110 may receive a match between an image in the notification(s) and an image captured by the vehicle's camera. The match may be determined on-board using image processing logic. As an example, the vehicle camera may capture a license plate image which may be compared to the image in the notification(s). If a match exists, the user may be notified and the match automatically or manually transmitted to the PSAP 110. Image capture by the camera may be triggered by the vehicle occupant via a tactile or audible command.

Figure 5:
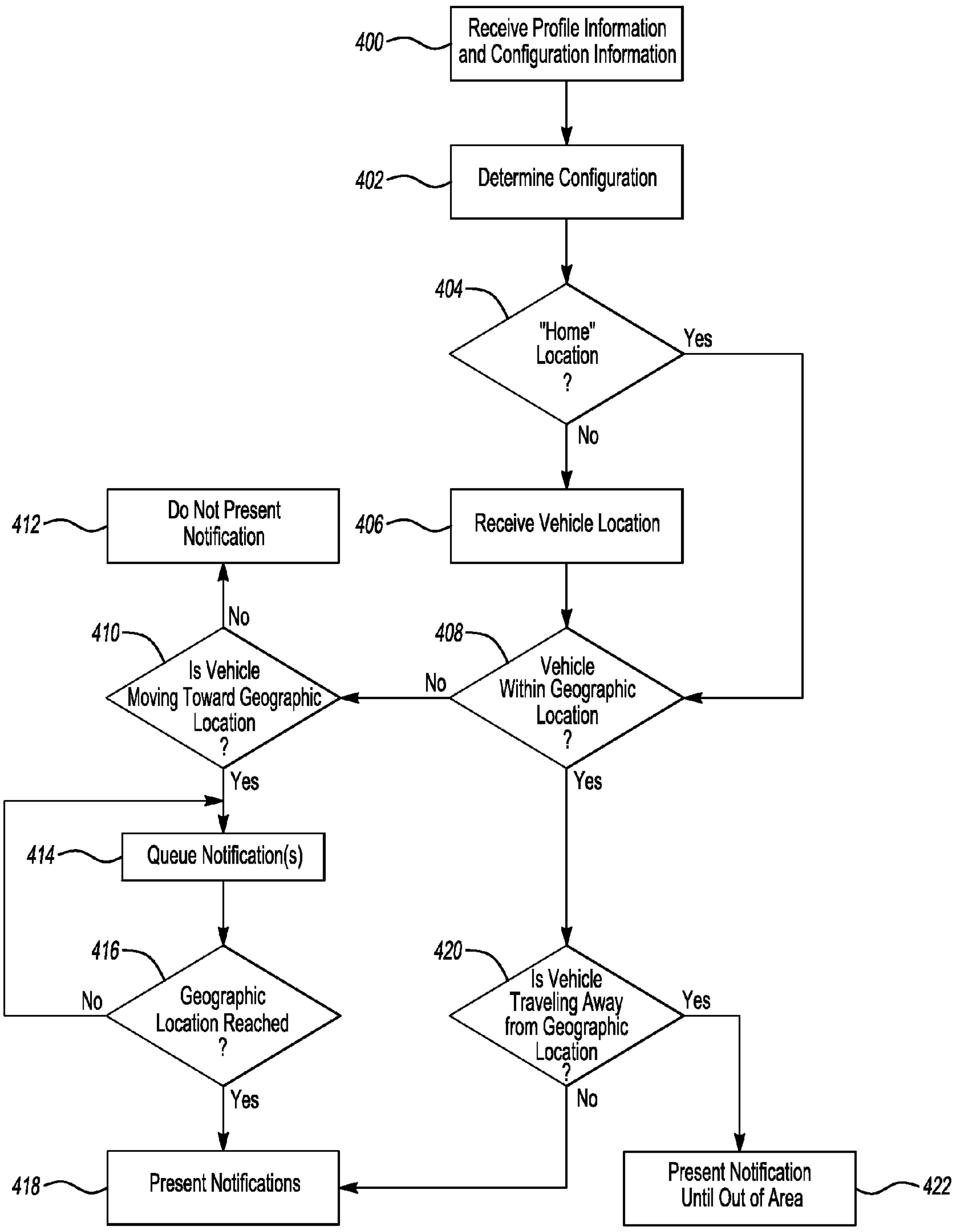
FIG. 5 illustrates the operation of the system illustrates in FIG. 2 according to another embodiment.

FIG. 5 illustrates a process for presenting the emergency notification messages. It will be appreciated that the disclosure and arrangement of FIG. 5 may be modified or re-arranged to best fit a particular implementation of the various embodiments of the invention.

The profile information and the emergency notification configuration information may be received on-board/off board (block 400). The notification configuration may be examined (block 402). In some embodiments, the configuration information may also be saved on the VCS 1.

An on-board/off-board determination may be made as to whether the vehicle is located at the vehicle occupant's "home" location (block 404). Alternatively or additionally, the broker 102*a,b* may receive the vehicle's location (block 406). In either case, the broker 102*a,b* may determine if the vehicle is within the specified geographic parameters for broadcasting emergency notifications (block 408). Some non-limiting examples are provided above. The geographic parameters may also be based on the location of the vehicle in a particular city, county, state, or region of the country. It will be appreciated that if the broker is off-board, the determination may be made by application software on-board (as described above).

Additionally or alternatively, the geographic parameters may include a proximity of the vehicle to the emergency as defined by a geographic attribute defined in the emergency notifications. For example, the decision to present the emergency notification(s) to the vehicle occupant may be based on the proximity of the vehicle to the last known location of the suspect or the abducted child as may be defined in (or with) the emergency notification(s). As another example, the decision may be based on the proximity to a tornado. It should be understood that the location of the vehicle may be determined based on GPS data and/or other location determining methods known in the art. Further, it will be appreciated that the various geographic parameters (e.g., distance parameters and proximity parameters) may be used in combination.

As described above, the broker 102*a,b* may determine the coverage area of the notifications. Using this information, the broker 102*a,b* may determine if the vehicle's geographic location parameters fall in the coverage area of the notification(s). For example, and without limitation, the broker 102*a,b* may determine if the notification region and the geographic location parameters correspond.

If the vehicle is not within the geographic location, a further determination may be made if the vehicle is moving toward the geographic location (block 410). If not, the notification(s) may not be presented (block 412). In some embodiments, however, the notification(s) may be stored in on-board/off board memory.

If the vehicle is travelling toward the geographic location, a further determination may be made if the geographic location has been reached (block 416). For example, reaching the geographic location may include travelling within the specified radius, crossing the state border, travelling within the proximity distance, and the like. In some embodiments, the notification message(s) may be queued in a message queue until the geographic location is reached (block 414).

If the geographic location is not reached, the broker 102 may continue to monitor if the vehicle is moving toward the geographic location (block 410). If there is a message queue, the notification(s) may remain in the message queue. If the vehicle has reached the geographic location, the notification(s) may be presented to the vehicle occupant (block 418). The notification(s) may be presented until the notification(s) are acknowledged by the vehicle occupant.

In one embodiment, as the vehicle is travelling toward the geographic location, different levels of detail relating to the emergency may be presented to the vehicle occupant. For example, if the vehicle is a "Y" distance from the geographic location, the vehicle occupant may be presented (audible and/or visual) with a message that says, "You are approaching an emergency notification area." As the vehicle travels closer to the geographic location, additional details may be presented to the vehicle occupant. Of course, when the geographic location is reached, an emergency notification with full details may be presented.

Additionally or alternatively, as the vehicle travels closer to the geographic location, the priority of the emergency notification may increase. For example, as the vehicle is travelling toward the geographic location, the message may be displayed for a particular period of time (e.g., a few seconds) and removed from the display without an acknowledgment. However, when the vehicle reaches the geographic location, the message may be locked on the display until acknowledged by the vehicle occupant. As another example, the message may be presented (audibly or visually) less frequently until the geographic location is reached. When the geographic location is reach, the notification may be presented repeatedly (and, in some embodiments frequently) and an acknowledgment may be required.

Referring back to block 408, if the vehicle is within the geographic location, a further determination may be made if the vehicle is travelling away from the location (block 420). If so, the notification(s) may be presented to the vehicle occupant until the vehicle is outside of the geographic location (block 422). If the vehicle is not travelling away from the geographic location, the notification(s) may be presented to the vehicle occupant, as illustrated in block 418. In either case, the vehicle occupant may acknowledge the notification(s).

In some embodiments, the process of FIG. 5 may also be used to present stored notifications. For example, notifications may be stored on-board or off-board and presented to the user periodically (e.g., and without limitation, daily) until the notification(s) expire and/or an update has been received from the ENS 104 regarding a change in status of the emergency (e.g., the emergency has been resolved).

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed:

1. A computer-implemented method comprising:

receiving at a vehicle computer an emergency notification having a an emergency-incident location geographic attribute;

receiving vehicle GPS location data at a vehicle computer;

determining, via the vehicle computer if the emergency-incident is within a predefined proximity to the vehicle GPS location, based on the geographic vehicle location and the geographic attribute; and outputting the emergency notification, when the emergency-incident is within the predefined proximity to the vehicle GPS location.

2. The computer-implemented method of claim 1 wherein the emergency notification is a government issued emergency notification.

3. The computer-implemented method of claim 1, wherein the predefined proximity is user-input.

4. The computer-implemented method of claim 3 wherein the proximity is defined as a radius centered around a vehicle.

5. The computer-implemented method of claim 1 wherein the outputting is based on a direction of travel of the vehicle towards the emergency-incident.

6. The computer-implemented method of claim 1 further comprising transmitting a request for the one or more emergency notifications.

7. A non-transitory computer-readable storage medium storing instructions which, when executed by a vehicle computing system processor, cause the processor to perform the method comprising:

receiving at a vehicle computer an emergency notification having an emergency-incident location geographic attribute;

receiving vehicle GPS location data at a vehicle computer; determining, via the vehicle computer, if the emergency-incident is within a predefined proximity to the vehicle GPS location, based on the geographic vehicle location and the geographic attribute; and outputting the emergency notification, when the emergency-incident is within the predefined proximity to the vehicle GPS location.

8. The computer-readable storage medium of claim 7 wherein the emergency notifications are at least one of an AMBER alert, weather-related alert, or a public safety alert.

9. The computer-readable storage medium of claim 7 further comprising instructions for:

receiving a user home location;

and outputting the emergency notification, if the emergency-incident is within the predefined proximity to the user home location.

10. The computer-readable storage medium of claim 9 wherein the user home location is defined by the vehicle occupant.

11. A system comprising: a processor configured to:

receive at a vehicle computer an emergency notification having an emergency-incident location geographic attribute;

receive vehicle GPS location data at a vehicle computer;

determine if the emergency-incident is within a predefined proximity to the vehicle GPS location, based on the geographic vehicle location and the geographic attribute; and output the emergency notification, when the emergency-incident is within the predefined proximity to the vehicle GPS location.

12. The system of claim 11 wherein the emergency notification includes one or more images of a subject of the emergency notifications.

13. The system of claim 12 wherein the subject is selected from the group consisting of missing persons, suspected criminals, missing vehicles, or a combination thereof.

14. The system of claim 12 wherein the subject is meteorological events.

15. The system of claim 12 wherein the image is a license plate.

* * * * *